US00RE39505E

(19) United States
(12) Reissued Patent
Thomas et al.

(10) Patent Number: US RE39,505 E
(45) **Date of Reissued Patent: *Mar. 13, 2007**

(54) FILL-THROUGH-THE-TOP PACKAGE AND METHOD AND APPARATUS FOR MAKING THE SAME

(75) Inventors: Toby R. Thomas, Pleasant Prairie, WI (US); Samuel D. Aversa, Farmington, NY (US); John D. Athans, Victor, NY (US)

(73) Assignee: Pactiv Corporation, Lake Forest, IL (US)

( * ) Notice: This patent is subject to a terminal disclaimer.

(21) Appl. No.: 10/647,819

(22) Filed: Aug. 25, 2003

Related U.S. Patent Documents

Reissue of:
(64) Patent No.: 6,279,298
Issued: Aug. 28, 2001
Appl. No.: 09/422,510
Filed: Oct. 21, 1999

U.S. Applications:
(62) Division of application No. 09/373,312, filed on Aug. 12, 1999, now Pat. No. 6,071,011.

(51) Int. Cl.
*B65B 1/04* (2006.01)
*B65B 61/18* (2006.01)

(52) U.S. Cl. ..... 53/412; 53/459; 53/469; 53/133.4; 53/139.2; 53/284.7; 53/562; 53/570; 493/213

(58) Field of Classification Search ..... 53/412, 53/455, 459, 469, 133.4, 139.2, 562, 570, 53/550, 450; 493/213, 214, 927
See application file for complete search history.

(56) References Cited

U.S. PATENT DOCUMENTS 1,992,152 A * 2/1935 Yeates
2,064,432 A * 12/1936 Keidel
2,506,311 A * 5/1950 Moore
2,560,535 A * 7/1951 Allen
2,848,031 A * 8/1958 Svee et al.
2,898,027 A * 8/1959 Scholle
2,978,769 A * 4/1961 Harrah
2,994,469 A * 8/1961 Troup et al.

(Continued)

FOREIGN PATENT DOCUMENTS

EP 0 109 793 5/1984
EP 0 109 793 * 3/1987
EP 0 276 554 * 8/1988
EP 0 302 144 * 2/1989
EP 0 239 319 * 9/1990
EP 0 374 539 * 9/1993
EP 0 939 034 A1 9/1999
EP 0 978 450 A1 2/2000

(Continued)

*Primary Examiner*—John Sipos
(74) *Attorney, Agent, or Firm*—Jenkens & Gilchrist

(57) ABSTRACT

A fill-through-the-top reclosable package includes first and second opposing body panels joined to each other along a pair of sides and a bottom bridging the pair of sides. The package is provided with a reclosable fastener extending alone a package top disposed opposite the bottom. The fastener includes first and second opposing tracks. The first track includes a male profile, while the second track includes a female profile adapted to releasably interlock with the male profile. To provide tamper evidence, the first and second tracks may be joined to each other along an area of weakness. When making the package, the first track is first attached to the first panel, the package, the first track is first attached to the first panel, the package is filled with a product via a fill opening between the second track and the second panel, and then the second track is attached to the second panel.

69 Claims, 8 Drawing Sheets

U.S. PATENT DOCUMENTS 3,054,434 A * 9/1962 Ausnit et al.
3,104,798 A * 9/1963 Stone
3,172,443 A * 3/1965 Ausnit
3,181,583 A * 5/1965 Lingenfelter
3,198,228 A * 8/1965 Naito
3,226,787 A * 1/1966 Ausnit
3,256,981 A * 6/1966 Kurtz
3,259,951 A * 7/1966 Zimmerman ..... 24/399
3,262,634 A * 7/1966 Goodwin
3,282,493 A * 11/1966 Kamins et al.
3,313,471 A * 4/1967 Dickard et al.
3,325,084 A * 6/1967 Ausnit
3,326,399 A * 6/1967 Ausnit
3,338,285 A * 8/1967 Jaster
3,339,606 A * 9/1967 Kugler
3,368,740 A * 2/1968 Rohde
3,371,696 A * 3/1968 Ausnit
3,381,592 A * 5/1968 Ravel ..... 493/197
3,387,640 A * 6/1968 Butler
3,416,986 A * 12/1968 Carley
3,417,675 A * 12/1968 Ausnit
3,425,469 A * 2/1969 Ausnit
3,426,396 A * 2/1969 Laguerre ..... 24/427
3,437,258 A * 4/1969 Kugler ..... 229/58
3,456,867 A * 7/1969 Repko
3,460,337 A * 8/1969 Feild
3,462,068 A * 8/1969 Suominen
3,471,005 A * 10/1969 Sexstone
3,473,589 A * 10/1969 Gotz
3,532,571 A * 10/1970 Ausnit
3,535,409 A * 10/1970 Rohde
3,543,343 A * 12/1970 Staller et al.
3,565,147 A * 2/1971 Ausnit
RE27,174 E * 9/1971 Ausnit ..... 383/35
3,608,439 A * 9/1971 Ausnit
3,613,524 A * 10/1971 Behr ..... 493/214
3,619,395 A * 11/1971 Skendzie
3,625,270 A * 12/1971 Skendzic
3,633,642 A * 1/1972 Slegel
3,640,381 A * 2/1972 Kanada et al. ..... 229/206
3,655,503 A * 4/1972 Stanley et al.
3,679,511 A * 7/1972 Ausnit ..... 156/251
3,701,191 A * 10/1972 Laguerre ..... 29/768
3,701,192 A * 10/1972 Laguerre ..... 29/768
3,711,011 A * 1/1973 Kugler
3,722,672 A * 3/1973 Ebata
3,738,567 A * 6/1973 Ruda ..... 383/75
3,744,211 A * 7/1973 Titchenal et al. ..... 53/459
3,746,215 A * 7/1973 Ausnit et al.
3,780,781 A * 12/1973 Uramoto
3,785,111 A * 1/1974 Pike ..... 53/410
3,790,992 A * 2/1974 Herz ..... 24/400
3,815,317 A * 6/1974 Toss ..... 53/451
3,817,017 A * 6/1974 Titchenal ..... 53/437
3,818,963 A * 6/1974 Whitman
3,827,472 A * 8/1974 Uramoto
3,839,128 A * 10/1974 Arai
3,868,891 A * 3/1975 Parish ..... 493/194
3,903,571 A * 9/1975 Howell
3,909,887 A * 10/1975 Yoshida
3,948,705 A * 4/1976 Ausnit
3,953,661 A * 4/1976 Gulley
3,988,184 A * 10/1976 Howard ..... 156/66
3,991,801 A * 11/1976 Ausnit
4,003,972 A * 1/1977 Herz
4,094,729 A * 6/1978 Boccia ..... 156/515
4,101,355 A * 7/1978 Ausnit ..... 156/66
4,112,990 A * 9/1978 Anderson
4,118,166 A * 10/1978 Bartrum
4,153,090 A * 5/1979 Rifkin
4,189,050 A * 2/1980 Jensen et al.
4,189,809 A * 2/1980 Sotos
4,191,230 A * 3/1980 Ausnit
4,196,030 A * 4/1980 Ausnit
4,212,337 A * 7/1980 Kamp
4,235,653 A * 11/1980 Ausnit
4,240,241 A * 12/1980 Sanborn, Jr.
4,241,865 A * 12/1980 Ferrell
4,246,288 A * 1/1981 Sanborn, Jr.
4,249,982 A * 2/1981 Ausnit
4,252,238 A * 2/1981 Spiegelberg et al.
4,277,241 A * 7/1981 Schulze ..... 493/196
4,279,677 A * 7/1981 Takahashi
4,285,376 A * 8/1981 Ausnit
4,295,919 A * 10/1981 Sutrina et al.
4,309,233 A * 1/1982 Akashi
4,341,575 A * 7/1982 Herz ..... 156/66
4,355,494 A * 10/1982 Tilman ..... 53/416
4,363,345 A * 12/1982 Scheibner
4,372,793 A * 2/1983 Herz ..... 156/66
4,379,806 A * 4/1983 Korpman
4,415,386 A * 11/1983 Ferrell et al. ..... 493/213
4,419,159 A * 12/1983 Herrington
4,428,477 A * 1/1984 Cristofolo
4,428,788 A * 1/1984 Kamp
4,430,070 A * 2/1984 Ausnit
4,437,293 A * 3/1984 Sanborn, Jr.
4,446,088 A * 5/1984 Daines ..... 264/155
4,490,959 A * 1/1985 Lems ..... 53/459
4,497,678 A * 2/1985 Nussbaum
4,498,939 A * 2/1985 Johnson
4,514,962 A * 5/1985 Ausnit ..... 53/457
4,515,647 A * 5/1985 Behr
4,517,788 A * 5/1985 Scheffers ..... 53/459
4,518,087 A * 5/1985 Goglio
4,522,305 A * 6/1985 Jacobsson
4,528,224 A * 7/1985 Ausnit
4,540,537 A * 9/1985 Kamp
4,555,282 A * 11/1985 Yano
4,561,109 A * 12/1985 Herrington
4,563,319 A * 1/1986 Ausnit et al. ..... 264/146
4,573,203 A * 2/1986 Peppiatt
4,581,006 A * 4/1986 Hugues et al. ..... 493/213
4,582,549 A * 4/1986 Ferrell
4,584,201 A * 4/1986 Boston
4,586,319 A * 5/1986 Ausnit ..... 53/468
4,589,145 A * 5/1986 Van Erden et al.
4,601,694 A * 7/1986 Ausnit
4,602,405 A * 7/1986 Sturman et al.
4,612,153 A * 9/1986 Mangla ..... 264/154
4,615,083 A * 10/1986 Mayerhofer
4,617,683 A * 10/1986 Christoff
4,620,320 A * 10/1986 Sullivan ..... 383/203
4,638,913 A * 1/1987 Howe, Jr.
4,646,511 A * 3/1987 Boeckmann et al. ..... 53/551
4,651,504 A * 3/1987 Bentsen ..... 53/452
4,652,496 A * 3/1987 Yasufuku et al. ..... 428/425.9
4,654,878 A * 3/1987 Lems ..... 383/37
4,655,862 A * 4/1987 Christoff et al. ..... 156/66
4,656,075 A * 4/1987 Mudge
4,663,915 A * 5/1987 Van Erden et al. ..... 53/450
4,664,649 A * 5/1987 Johnson et al.
4,665,552 A * 5/1987 Lems et al. ..... 383/37
4,665,557 A * 5/1987 Kamp ..... 383/63
4,666,536 A * 5/1987 Van Erden et al.
4,673,383 A * 6/1987 Bentsen
4,682,366 A * 7/1987 Ausnit et al.
4,691,372 A * 9/1987 Van Erden ..... 383/63
4,698,118 A * 10/1987 Takahashi et al.
4,703,518 A * 10/1987 Ausnit ..... 383/63
4,709,398 A * 11/1987 Ausnit ..... 383/63

4,709,533 A * 12/1987 Ausnit
4,710,157 A * 12/1987 Posey ..... 493/213
4,713,839 A * 12/1987 Peppiatt
4,736,450 A * 4/1988 Van Erden et al.
4,736,451 A * 4/1988 Ausnit
4,744,674 A * 5/1988 Nocek
4,755,247 A * 7/1988 Mudge
4,755,248 A * 7/1988 Geiger et al.
4,782,951 A * 11/1988 Griesbach et al.
4,786,190 A * 11/1988 Van Erden et al.
4,787,880 A * 11/1988 Ausnit ..... 493/213
4,790,126 A * 12/1988 Boeckmann ..... 53/451
4,791,710 A * 12/1988 Nocek et al.
4,792,240 A * 12/1988 Ausnit ..... 383/63
4,807,300 A * 2/1989 Ausnit et al. ..... 383/65
4,812,074 A * 3/1989 Ausnit et al. ..... 493/213
4,817,188 A * 3/1989 Van Erden
4,832,505 A * 5/1989 Ausnit et al.
4,835,835 A * 6/1989 Gould
4,840,012 A * 6/1989 Boeckmann ..... 53/410
4,840,611 A * 6/1989 Van Erden et al. ..... 493/213
4,844,759 A * 7/1989 Boeckmann ..... 156/66
4,846,585 A * 7/1989 Boeckmann et al.
4,848,064 A * 7/1989 Lems et al. ..... 53/459
4,850,178 A * 7/1989 Ausnit ..... 53/570
4,855,168 A * 8/1989 Imaizumi
4,863,285 A * 9/1989 Claxton ..... 383/37
4,875,587 A * 10/1989 Lulham et al.
4,876,842 A * 10/1989 Ausnit ..... 53/410
4,877,336 A * 10/1989 Peppiatt
4,878,987 A * 11/1989 Ven Erden ..... 156/519
4,889,731 A * 12/1989 Williams, Jr.
4,890,935 A * 1/1990 Ausnit et al.
4,892,414 A * 1/1990 Ausnit ..... 383/63
4,892,512 A * 1/1990 Branson ..... 493/194
4,894,975 A * 1/1990 Ausnit ..... 53/412
4,895,198 A * 1/1990 Samuelson
4,902,140 A * 2/1990 Branson
4,909,017 A * 3/1990 McMahon et al. ..... 53/410
4,923,309 A * 5/1990 Van Erden
4,924,655 A * 5/1990 Posey ..... 53/133.2
4,925,316 A * 5/1990 Van Erden et al.
4,925,318 A * 5/1990 Sorensen
4,929,225 A * 5/1990 Ausnit et al. ..... 493/213
4,941,307 A * 7/1990 Wojcik ..... 53/412
4,944,409 A * 7/1990 Busche et al.
4,945,714 A * 8/1990 Bodolay et al. ..... 53/568
4,947,525 A * 8/1990 Van Erden
4,969,309 A * 11/1990 Schwarz et al. ..... 53/412
4,969,967 A * 11/1990 Sorensen et al.
4,971,454 A * 11/1990 Branson et al.
4,974,395 A * 12/1990 McMahon ..... 53/551
4,993,212 A * 2/1991 Veoukas ..... 53/451
5,005,707 A * 4/1991 Hustad et al. ..... 383/210
5,007,142 A * 4/1991 Herrington
5,007,143 A * 4/1991 Herrington
5,010,627 A * 4/1991 Herrington et al.
5,014,498 A * 5/1991 McMahon ..... 53/451
5,017,021 A * 5/1991 Simonsen et al.
5,020,194 A * 6/1991 Herrington et al.
5,022,530 A * 6/1991 Zieke
5,023,122 A * 6/1991 Boeckmann et al.
5,024,537 A * 6/1991 Tilman ..... 383/63
5,027,584 A * 7/1991 McMahon et al. ..... 53/451
5,033,868 A * 7/1991 Peppiatt
5,035,517 A * 7/1991 Edelman ..... 53/133.4
RE33,674 E * 8/1991 Uramoto
5,036,643 A * 8/1991 Bodolay ..... 53/128.1
5,042,224 A * 8/1991 McMahon ..... 53/133.4
5,046,300 A * 9/1991 Custer et al. ..... 53/412
5,063,069 A * 11/1991 Van Erden et al.
5,063,639 A * 11/1991 Boeckmann et al. .... 24/30.5 R
5,063,644 A * 11/1991 Herrington et al.
5,065,899 A * 11/1991 Tilman
5,066,444 A * 11/1991 Behr
5,067,208 A * 11/1991 Herrington et al.
5,067,822 A * 11/1991 Wirth et al.
5,070,583 A * 12/1991 Herrington
5,071,689 A * 12/1991 Tilman ..... 428/121
5,072,571 A * 12/1991 Boeckmann ..... 53/133.4
5,085,031 A * 2/1992 McDonald ..... 53/412
5,088,971 A * 2/1992 Herrington
5,092,684 A * 3/1992 Weeks
5,092,831 A * 3/1992 James et al.
5,096,516 A * 3/1992 McDonald et al. ..... 156/66
5,100,246 A * 3/1992 La Pierre et al.
5,105,603 A * 4/1992 Natterer ..... 53/412
5,107,658 A * 4/1992 Hustad et al. ..... 53/408
5,111,643 A * 5/1992 Hobock ..... 53/551
5,112,138 A * 5/1992 Peppiatt
5,116,301 A * 5/1992 Robinson et al.
5,121,997 A * 6/1992 La Pierre et al.
5,127,208 A * 7/1992 Custer et al. ..... 53/412
5,129,734 A * 7/1992 Van Erden
5,131,121 A * 7/1992 Herrington et al.
5,147,272 A * 9/1992 Richison et al. ..... 493/195
5,152,613 A * 10/1992 Herrington, Jr.
5,161,286 A * 11/1992 Herrington, Jr. et al.
5,167,608 A * 12/1992 Steffens, Jr. et al. ..... 493/214
5,179,816 A * 1/1993 Wojnicki ..... 53/133.4
5,186,543 A * 2/1993 Cochran
5,188,461 A * 2/1993 Sorensen ..... 383/210.1
5,189,764 A * 3/1993 Herrington et al.
5,198,055 A * 3/1993 Wirth et al.
5,209,574 A * 5/1993 Tilman ..... 383/63
5,211,482 A * 5/1993 Tilman
5,224,779 A * 7/1993 Thompson et al.
5,247,781 A * 9/1993 Runge ..... 53/412
5,254,073 A * 10/1993 Richison et al. ..... 493/195
5,259,904 A * 11/1993 Ausnit ..... 156/244.15
5,273,511 A * 12/1993 Boeckmann ..... 493/195
5,283,932 A * 2/1994 Richardson et al.
RE34,554 E * 3/1994 Ausnit
5,301,394 A * 4/1994 Richardson et al.
5,301,395 A * 4/1994 Richardson et al.
5,322,579 A * 6/1994 Van Erden ..... 156/66
5,334,127 A * 8/1994 Bruno et al. ..... 493/194
5,366,294 A * 11/1994 Wirth et al.
5,383,989 A * 1/1995 McMahon ..... 156/66
5,391,136 A * 2/1995 Makowka ..... 493/210
5,400,565 A * 3/1995 Terminella et al. ..... 53/133.4
5,400,568 A * 3/1995 Kanemitsu et al. ..... 53/412
RE34,905 E * 4/1995 Ausnit ..... 53/412
RE34,906 E * 4/1995 Tamaki et al. ..... 123/399
5,403,094 A * 4/1995 Tomic ..... 383/63
5,405,478 A * 4/1995 Richardson et al.
5,405,629 A * 4/1995 Marnocha et al. ..... 426/122
5,412,924 A * 5/1995 Ausnit ..... 53/412
5,415,904 A * 5/1995 Takubo et al. ..... 428/35.2
5,425,216 A * 6/1995 Ausnit ..... 53/410
5,425,825 A * 6/1995 Rasko et al.
5,426,830 A * 6/1995 Richardson et al.
5,431,760 A * 7/1995 Donovan
5,435,864 A * 7/1995 Machacek et al.
5,442,837 A * 8/1995 Morgan
5,442,838 A * 8/1995 Richardson et al.
5,448,807 A * 9/1995 Herrington et al.
5,448,808 A * 9/1995 Gross
5,456,928 A * 10/1995 Hustad et al.
5,461,845 A * 10/1995 Yeager ..... 53/451
5,470,156 A * 11/1995 May ..... 383/210
5,482,375 A * 1/1996 Richardson et al.

5,486,051 A * 1/1996 May
5,489,252 A * 2/1996 May ..... 383/210
5,492,411 A * 2/1996 May ..... 383/5
5,505,037 A * 4/1996 Terminella et al. ..... 53/133.4
5,509,735 A * 4/1996 May ..... 383/210
5,511,884 A * 4/1996 Bruno et al. ..... 383/63
5,513,915 A * 5/1996 May
5,519,982 A * 5/1996 Herber et al. ..... 53/412
5,525,363 A * 6/1996 Herber et al. ..... 426/130
5,542,902 A * 8/1996 Richison et al. ..... 493/195
5,551,127 A * 9/1996 May ..... 24/305
5,551,208 A * 9/1996 Van Erden ..... 53/139.2
5,552,202 A * 9/1996 May ..... 428/43
5,557,907 A * 9/1996 Malin et al. ..... 53/139.2
5,558,613 A * 9/1996 Tilman et al. ..... 493/214
5,561,966 A * 10/1996 English ..... 53/412
5,564,259 A * 10/1996 Stolmeier ..... 53/410
5,573,614 A * 11/1996 Tilman et al. ..... 156/66
5,582,853 A * 12/1996 Marnocha et al. ..... 426/122
5,592,802 A * 1/1997 Malin et al. ..... 53/133.4
5,613,934 A * 3/1997 May ..... 493/214
5,622,431 A * 4/1997 Simonsen ..... 383/63
5,625,927 A * 5/1997 Chu
5,628,566 A * 5/1997 Schreiter ..... 383/63
5,638,586 A * 6/1997 Malin et al. ..... 24/587
5,647,671 A * 7/1997 May ..... 383/210
5,664,299 A * 9/1997 Porchia et al.
5,669,715 A * 9/1997 Dobreski et al.
5,681,115 A * 10/1997 Diederich et al.
5,682,730 A * 11/1997 Dobreski
5,704,192 A * 1/1998 Jostler et al. ..... 53/384.1
5,711,751 A * 1/1998 Harmanoglu ..... 493/224
5,713,669 A * 2/1998 Thomas et al. ..... 383/204
5,725,312 A * 3/1998 May ..... 383/210
5,769,772 A * 6/1998 Wiley ..... 493/189
5,775,812 A * 7/1998 St. Phillips et al. ..... 383/5
5,776,045 A * 7/1998 Bodolay et al. ..... 493/215
5,782,733 A * 7/1998 Yeager ..... 493/213
5,788,378 A 8/1998 Thomas ..... 383/63
5,823,933 A * 10/1998 Yeager ..... 493/213
5,833,791 A 11/1998 Bryniarski et al. .... 156/244.25
5,873,969 A * 2/1999 Keith et al. ..... 156/91
5,906,438 A * 5/1999 Laudenberg ..... 383/63
5,911,508 A * 6/1999 Dobreski et al. ..... 383/5
5,924,173 A * 7/1999 Dobreski et al. ..... 24/400
5,938,337 A * 8/1999 Provan et al. ..... 383/5
5,956,924 A * 9/1999 Thieman ..... 53/412
5,964,532 A * 10/1999 St. Phillips et al. ..... 383/5
6,000,197 A * 12/1999 Ausnit ..... 53/412
6,017,412 A * 1/2000 Van Erden et al. ..... 53/133.4
6,044,621 A 4/2000 Malin et al. ..... 53/412
6,088,998 A * 7/2000 Malin et al. ..... 53/133.4
6,131,369 A * 10/2000 Ausnit ..... 53/412
6,131,374 A * 10/2000 Bois ..... 53/139.2
6,138,436 A 10/2000 Malin et al. ..... 53/133.4
6,138,439 A * 10/2000 McMahon et al. ..... 53/412
6,148,588 A * 11/2000 Thomas et al. ..... 53/412
6,212,857 B1 4/2001 Van Erden ..... 53/412
6,216,423 B1 4/2001 Thieman ..... 53/412
6,279,298 B1 8/2001 Thomas et al. ..... 53/412
6,286,189 B1 9/2001 Provan et al. ..... 24/30.5 R
6,286,999 B1 9/2001 Cappel et al. ..... 383/5
6,289,561 B1 9/2001 Provan et al. ..... 24/415
6,292,986 B1 9/2001 Provan et al. ..... 24/415
6,293,896 B1 9/2001 Buchman ..... 493/213
6,327,754 B1 12/2001 Belmont et al. ..... 24/400
6,347,437 B2 2/2002 Provan et al. ..... 24/400
6,360,513 B1 3/2002 Strand et al. ..... 53/412
6,363,692 B2 4/2002 Thieman ..... 53/412
6,412,254 B1 7/2002 Tilman et al. ..... 53/412
6,419,391 B2 7/2002 Thomas ..... 383/5
6,427,421 B1 8/2002 Belmont et al. ..... 53/412
6,439,770 B2 8/2002 Catchman ..... 383/5
6,470,551 B1 10/2002 Provan et al. ..... 29/408
6,499,272 B2 12/2002 Thieman ..... 53/412

FOREIGN PATENT DOCUMENTS

EP 1 026 077 A2 8/2000
FR 1 350 126 * 12/1963
FR 2 613 326 * 10/1988
GB 1 546 433 * 5/1979
GB 2 080 412 * 2/1982
GB 2 085 519 * 4/1982
GB 2 130 173 * 5/1984
GB 2 268 721 * 1/1994
GB 2 268 731 * 1/1994
JP 57 105248 * 12/1980
WO WO 95/29604 * 11/1995
WO WO 95/35046 * 12/1995
WO WO 95/35047 * 12/1995
WO WO 95/35048 * 12/1995
WO WO 99/24325 * 5/1999

* cited by examiner

FILL-THROUGH-THE-TOP PACKAGE AND METHOD AND APPARATUS FOR MAKING THE SAME

Matter enclosed in heavy brackets [ ] appears in the original patent but forms no part of this reissue specification; matter printed in italics indicates the additions made by reissue.

RELATED APPLICATION

This application is a divisional of U.S. application Ser. No. [09/373,212]*09/373,312*, filed Aug. 12, 1999, now issued as U.S. Pat. No. 6,071,011 on Jun. 6, 2000.

FIELD OF THE INVENTION

The present invention generally relates to packages to be filled with a product on a form, fill, and seal machine and, more particularly, to a reclosable package filled through its tip on a form, fill, and seal machine.

BACKGROUND OF THE INVENTION

A typical reclosable package includes first and second opposing panels joined to each other along a pair of sides and a bottom bridging the pair of sides. A reclosable fastener extends along a package top disposed opposite the bottom. The fastener generally includes first and second opposing tracks. The first track includes a male profile, while the second track includes a female profile adapted to releasably interlock with the male profile. The first and second tracks are thermally fused to, or integrally formed with, the respective first and second panels. To open and close the fastener, the package may be provided with a slider mounted to the fastener.

If reclosable packages of the foregoing type are to be prepackaged with a product and then sold in a store, the packages are typically prepared on a horizontal or vertical form, fill, and seal machine. In the form, fill, and seal machine, the package is first formed into the shape of a pouch having a fill opening at either the top or the bottom. If the fill opening is disposed at the bottom, then the top is sealed prior to filling the package. Similarly, if the fill opening is disposed at the top, then the bottom is sealed prior to filling the package. Next, the package filled with the product via the fill opening. Finally, the fill opening is sealed shut to fully enclose the product within the package. If the product delivered to the package includes food, then the fill opening is typically provided at the package bottom and a tamper-evident feature is provided along the top. The tamper-evident feature indicates to a consumer whether or not the package has been tampered with prior to purchase.

Some reclosable packages include a gusset along the bottom which expands in response to filling the package with a product. The gusset is advantageous because it increases the volume of product that can be contained in the package and, when the gusset expands, it allows the package to stand up on a store shelf. The stand-up package obviates the use of additional features such as headers with holes for hanging the package from a hook or post. The bottom gusset, however, makes it less practical to provide a fill opening at the bottom because most of the product resides in the gusset.

SUMMARY OF THE INVENTION

In accordance with one aspect of the present invention, a fill-through-the-top reclosable package includes first and second opposing body panels joined to each other along a pair of sides and a bottom bridging the pair of sides. The bottom optionally includes a gusset. The package is provided with a reclosable fastener extending along a package top disposed opposite the bottom. The fastener includes first and second opposing tracks. The first track includes a male profile, while the second track includes a female profile adapted to releasably interlock with the male profile. To provide tamper evidence, the first and second tracks are joined to each other along an area of weakness. The first and second tracks are optionally provided with respective first and second fins joined to each other along the aforementioned area of weakness to effectively create a single fin comprised of the first and second fins. To open and close the fastener, the package is optionally provided with a slider mounted to the fastener.

The package is convertible between a pre-filled condition and a post-filled condition. In the pre-filled condition, the first track is connected to the first panel, but the second track is only connected to the second panel along the sides thereby creating a fill opening between the second track and the second panel in a region between the sides. After the package is filled with a product via the fill opening, the package is converted to the post-filled condition. In the post-filled condition, the second track is connected to the second panel to seal the fill opening.

In accordance with another aspect of the present invention, a method of making a reclosable package includes the following sequence of steps:

(a) supplying a web of plastic material;

(b) supplying a reclosable fastener including first and second opposing tracks, the first track including a male profile, the second track including a female profile adapted to releasably interlock with the male profile, the first and second tracks being joined to each other along an area of weakness;

(c) folding the web to provide first and second opposing panels;

(d) attaching the first track to the first panel;

(e) sealing the web such that the first and second panels are joined to each other along a pair of sides and a bottom bridging the pair of sides;

(f) filling the package with a product via a fill opening between the second track and the second panel; and (g) attaching the second track to the second panel to seal the fill opening.

In accordance with yet another aspect of the present invention, another method of making a reclosable package includes the following sequence of steps:

(a) supplying a web of plastic material in a longitudinal direction;

(b) supplying a reclosable fastener including first and second opposing tracks, the first track including a male profile, the second track including a female profile adapted to releasably interlock with the male profile;

(c) folding the web along one or more longitudinal folds to provide first and second opposing panels, the longitudinal folds creating a bottom of the package;

(d) attaching the first track to the first panel;

(e) sealing the web along a pair of sides, the bottom bridging the pair of sides;

(f) filling the package with a product via a fill opening between the second track and the second panel; and (g) attaching the second track to the second panel to seal the fill opening.

In accordance with a further aspect of the present invention, there is provided an apparatus for performing the above methods.

BRIEF DESCRIPTION OF THE DRAWINGS

Other objects and advantages of the invention will become apparent upon reading the following detailed description and upon reference to the drawings in which.

Figure 1:
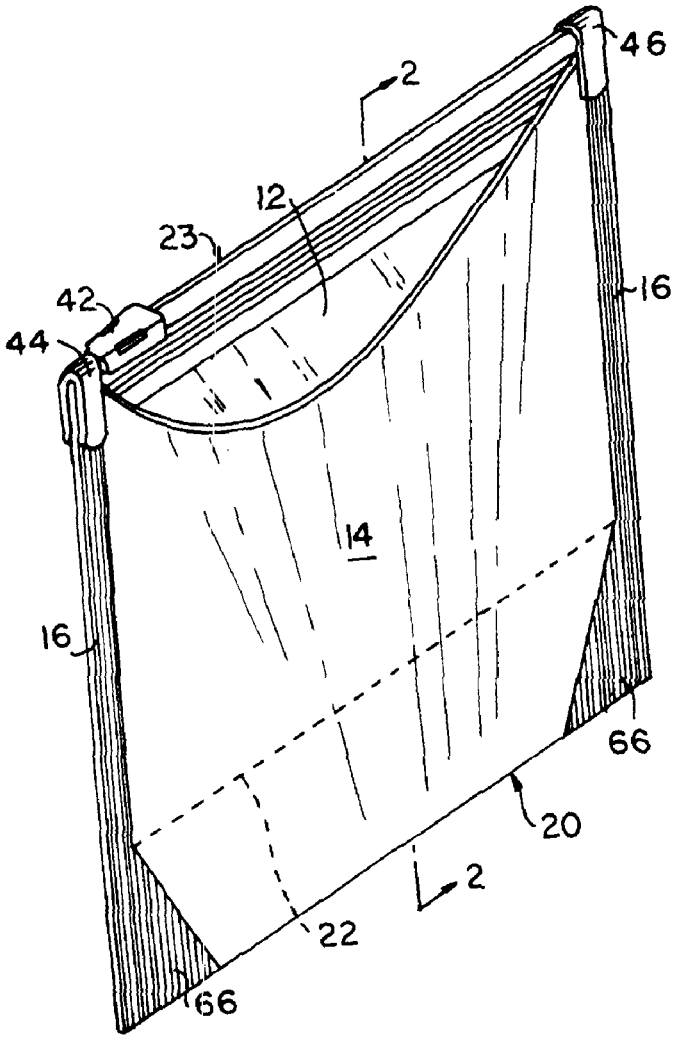
FIG. 1 is an isometric view of a reclosable plastic bag in a pre-filled condition embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Figure 2:
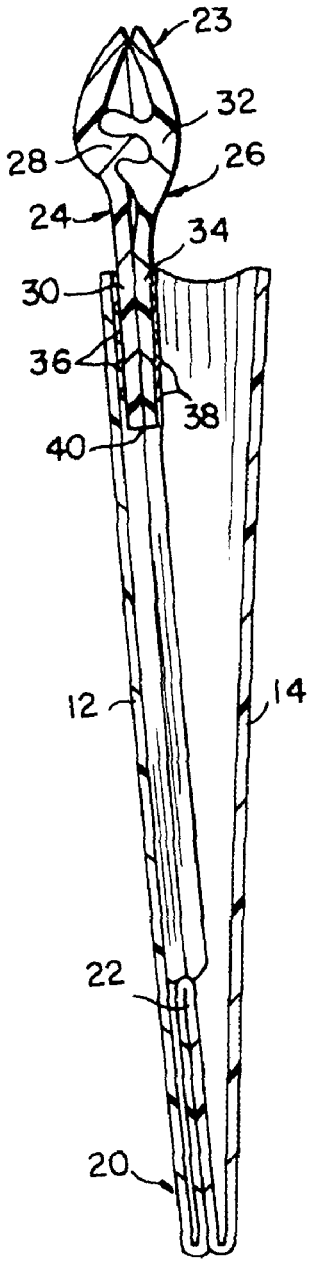
FIG. 2 is a sectional view taken generally along line 2—2 in FIG. 1.
Figure 3:
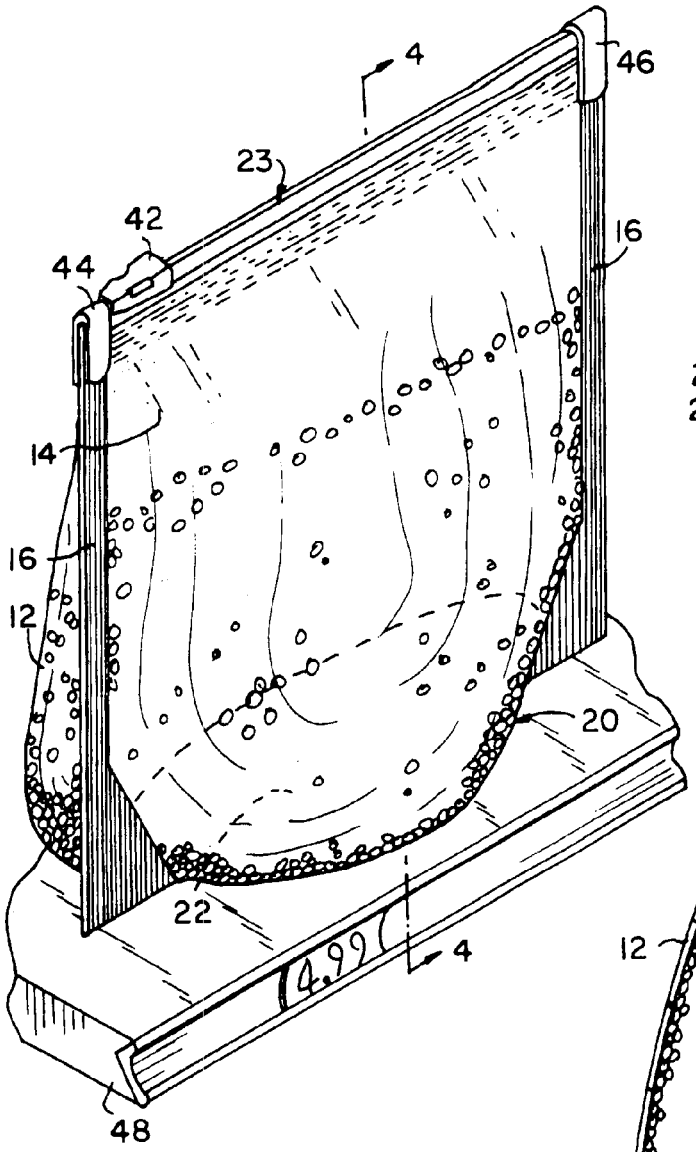
FIG. 3 is an isometric view of the reclosable plastic bag in a post-filled condition.
Figure 4:
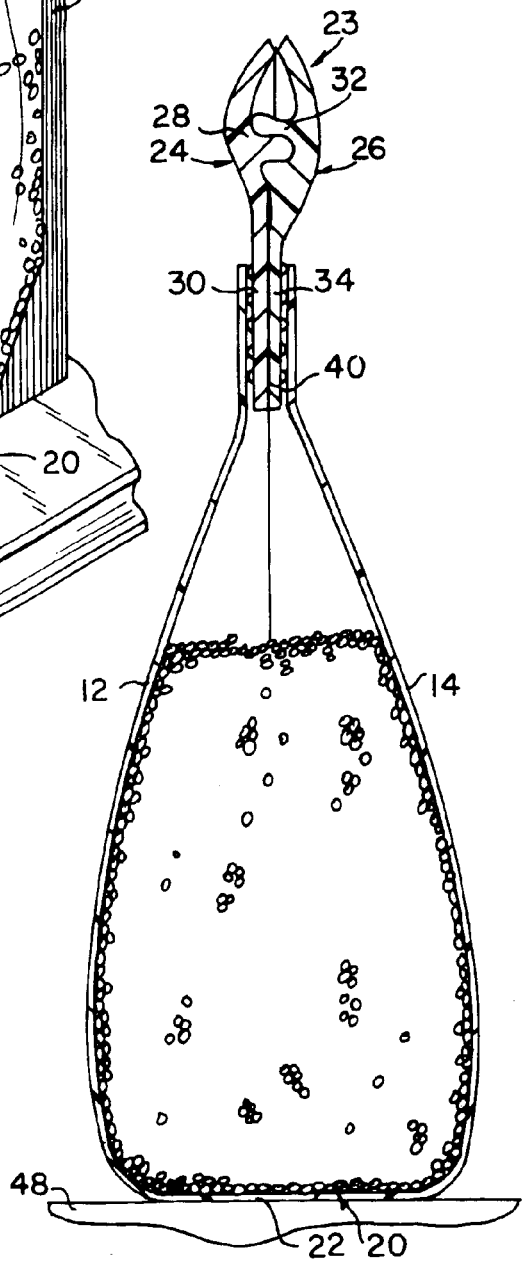
FIG. 4 is a sectional view taken generally along line 4—4 in FIG. 3.

Turning now to the drawings, FIGS. 1 and 3 depict a fill-through-the-top reclosable package 10, and FIGS. 2 and 4 depict a top portion of the package 10. Referring to FIGS. 1 through 4, the package 10 includes first and second opposing body panels 12 and 14 joined to each other along a pair of sides 16 and a bottom 20 bridging the pair of sides 16. The bottom 20 optionally includes a gusset 22.

The package 10 is provided with a reclosable fastener 23 extending along a package top disposed opposite the gusseted bottom 20. The fastener 23 includes first and second opposing tracks 24 and 26. The first track 24 includes a rib-type male profile 28 and a first fin 30 extending downward from the male profile 28, while the second track 26 includes a groove-type female profile 32 and a second fin 34 extending downward from the female profile 32. The male and female profiles 28 and 32 are adapted to interlock with each other. The first track 24 includes a plurality of narrow first sealant ribs 36 on an outer surface of the first fin 30 to facilitate connecting the first fin 30 to the first panel 12, and the second track 26 includes a plurality of narrow second sealant ribs 38 on an outer surface of the second fin 34 to facilitate connecting the second fin 34 to the second panel 14. To provide tamper evidence, lowermost ends of the first and second fins 30 and 34 are joined to each other along a line of weakness 40 to effectively create a single fin comprised of the first and second fins 30 and 34. The line of weakness 40 may be a scored line, a perforated line, a thinned die line, or a tear strip. In an alternative embodiment, the first and second tracks 24 and 26 do not include the respective depending fins 30 and 34, and tamper evidence is provided by joining the lowermost ends of the profiles 28 and 34 instead of the lowermost ends of the fins.

To open and close the fastener 23, the package 10 is optionally provided with a slider 42 mounted to the fastener 23. The slider 42 disengages the profiles 28 and 32 in response to movement along the fastener 23 in an opening direction and engages the profiles 28 and 32 in response to movement along the fastener 23 in a closing direction. To accommodate the slider 42 and make it difficult to open the fastener 23 without using the slider 42, the fastener 23 is preferably free to pull flanges extending upwardly from the male and female profiles 28 and 32. To stop movement of the slider 42 near the sides 16 of the package 10 and thereby prevent the slider 42 from sliding off the end of the fastener 23, a pair of end terminations 44 and 46 are mounted to the fastener 23 near the respective sides 16 of the package.10. The end termination 44 stops movement of the slider 42 in the opening direction, while the end termination 46 stops movement of the slider 42 in the closing direction. The end terminations 44 and 46 may be a separate element attached to the fastener 23, as shown in FIGS. 1 and 3, or may be integrally formed with the fastener 23. Examples of end terminations are disclosed in U.S. Pat. No. 5,088,971 to Herrington, U.S. Pat. No. 5,131,121 to Herrington et al., U.S. Pat. No. 5,161,286 to Herrington et al., U.S. Pat. No. 5,405,478 to Richardson et al., U.S. Pat. No. 5,442,837 to Morgan, U.S. Pat. No. 5,448,807 to Herrington, U.S. Pat. No. 5,482,375 to Richardson et al., and U.S. Pat. No. 5,924,173 to Dobreski et al., which are incorporated herein by reference in their entireties.

The package 10 is convertible between a pre-filled condition and a post-filled condition. In the pre-filled condition shown in FIGS. 1 and 2, the first fin 30 is connected to the first panel 12, but the second fin 34 is not connected to the second panel 14, except along the sides 16, thereby creating a fill opening between the second fin 34 and the second panel 14. After the package 10 is filled with a product via the fill opening, the package 10 is converted to the post-filled condition shown in FIGS. 3 and 4. In the post-filled condition, the second fin 34 is connected to the second panel 14 to seal the fill opening. If the bottom 20 includes the gusset 22, the gusset 22 expands in response to filling the package 10 with the product. The gusset 22 is advantageous because it increases the volume of product that can be contained in the package 10 and, when the gusset 22 expands, it allows the package 10 to stand up on a store shelf 48. The stand-up package 10 obviates the use of additional features such as headers with holes for hanging the package from a hook or post.

Figure 5A:
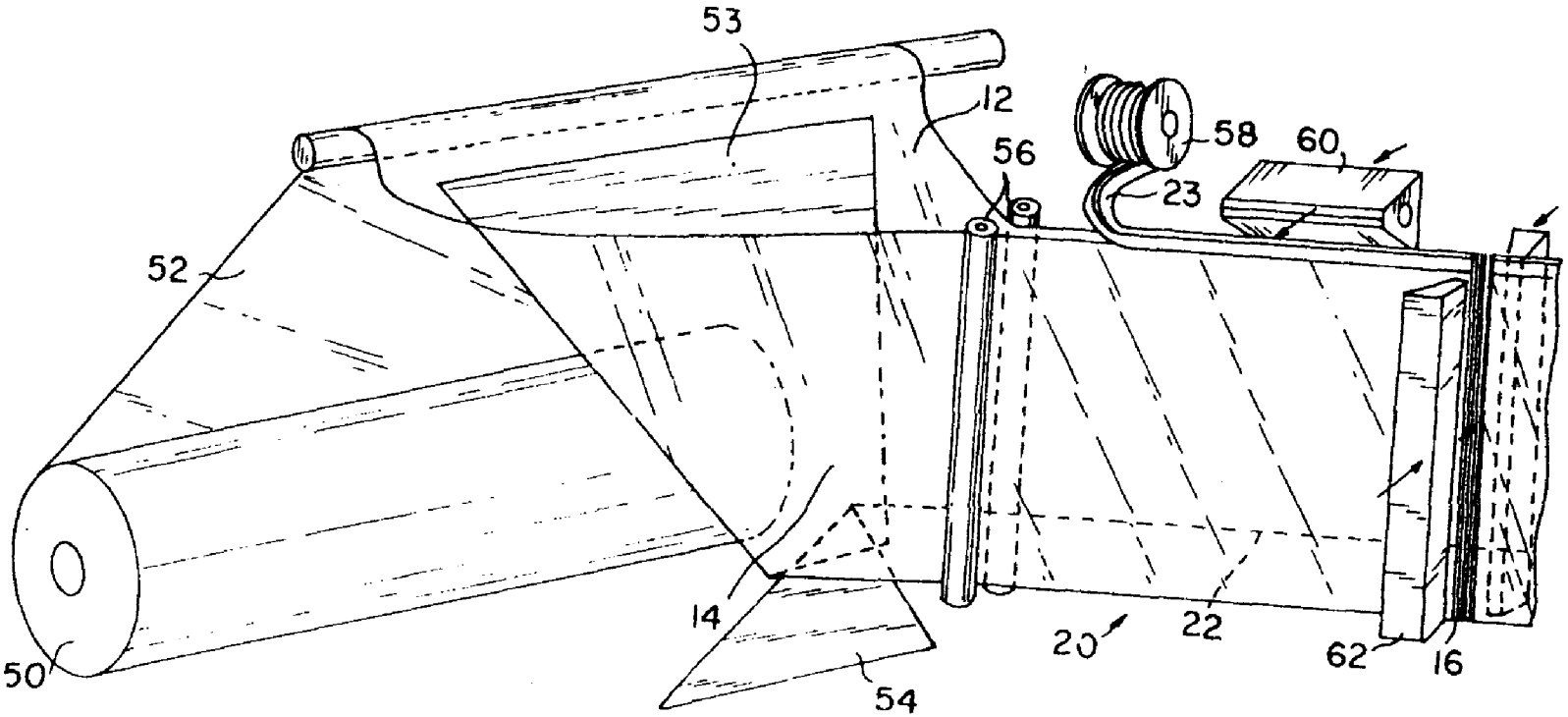
FIGS. 5a and 5b are a diagrammatic representation of a method and apparatus for making and filling the reclosable plastic bag.
Figure 5B:
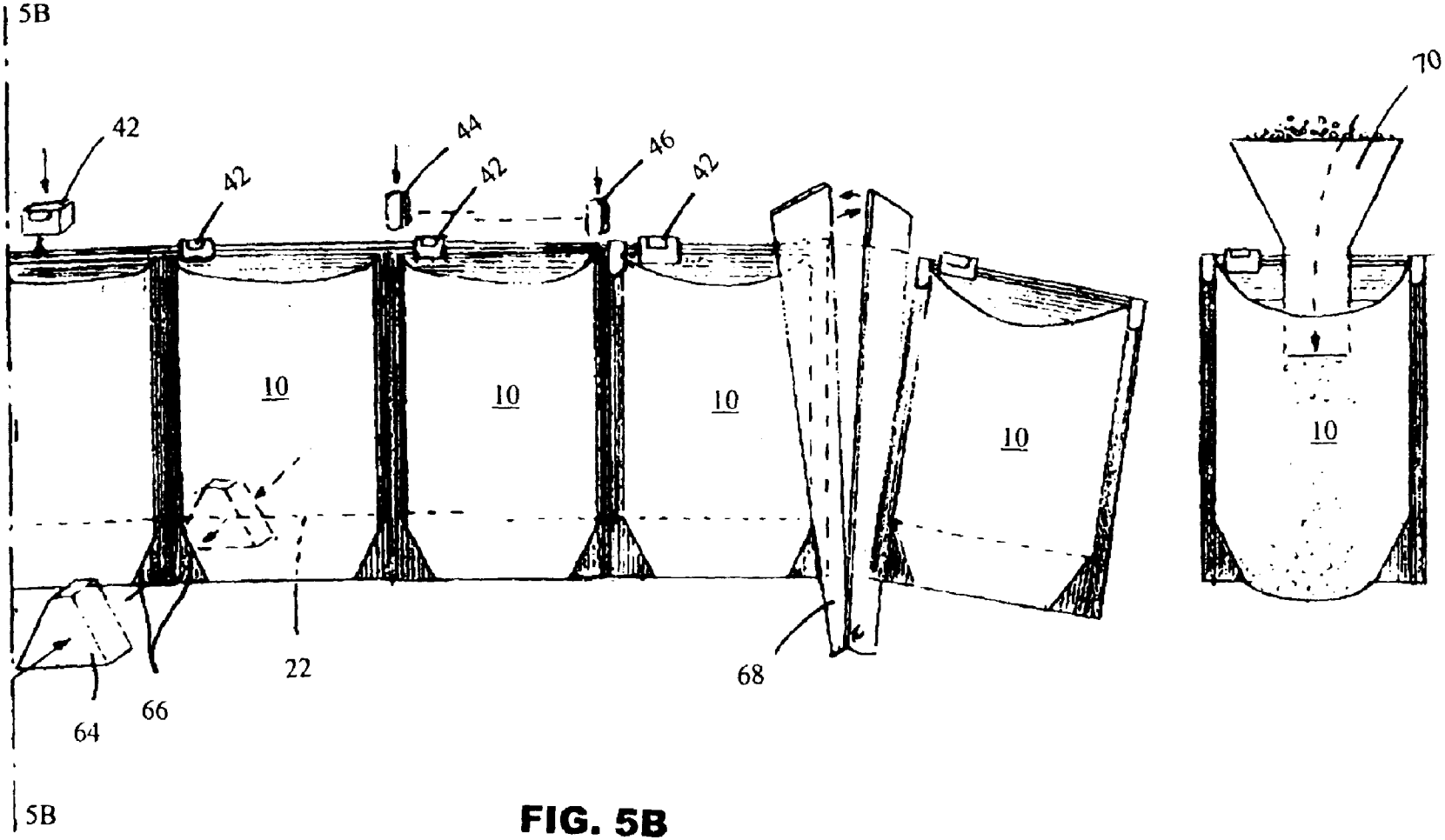

In accordance with another aspect of the present invention, there is provided a method and apparatus for making and filling the reclosable package 10. The method and apparatus are illustrated in FIGS. 5a–b, 6, 7, 8, and 9. Referring first to FIGS. 5a and 5b, a core 50 supplies a web 52 of plastic material. A folder 53 folds the web 52 to provide first and second opposing panels 12 and 14 joined along a bottom 20 having one or more fold lines. The folder 53 optionally includes a gusset point 54 that creates a gusset 22. The folded web 52 is conveyed between a pair of rollers 56 that bring the first and second panels 12 and 14 is close proximity to each other. A spool 58 supplies a reclosable fastener 23 having the structure discussed above. The fastener 23 is fed between the upper portions of the first and second panels 12 and 14.

A sealer 60 seals the first fin 30 (see FIGS. 1 and 2) to the first panel 12 in the machine direction, i.e., the direction of movement of the web 52. The sealer 60 may be a stationary convective (hot air) sealer that does not contact the web 52, a reciprocating heated bar sealer that intermittently contacts the web 52, or a band sealer comprising a heated band that moves with the web 52 until the seal is made. The first sealant ribs 36 (see FIGS. 1 and 2) on the outer surface of the first fin 30 facilitate this attachment between the first fin 30 and the first panel 12. At this time, the second fin 34 remains disconnected from the second panel 14. Another reciprocating heated bar sealer 62 seals the first and second panels 12 and 14 to each other in the transverse direction. The side seals 16 are generated by the sealer 62 at bag width distances apart to create individual packages 10. If the bottom 20 includes a gusset 22, a heated bar sealer 64 creates a pair of angle seals 66 along the gusset 22 on opposite sides of each side seal 16. The first and second panels 12 and 14 are attached to each other at the angle seals 66.

If the packages 10 are provided with respective sliders 42, the sliders 42 are mounted to the fastener 23 at bag width distances apart either before the fastener 23 is attached to the web 52 or after the fastener 23 is attached to the web 52. FIG. 5b depicts the sliders 42 as being installed after the fastener 23 is attached to the web 52 and after the formation of the side seals 16. To stop movement of the slider 42 near the sides 16 of each package 10, a pair of end terminations 44 and 46 are mounted to the fastener 23 on opposite sides of each side seal 16.

The sliders 42 may be installed using various techniques. For example, the slider 42 may have hinged wings that fold and snap permanently in place to attach the slider 42 to the fastener 23. Further details concerning such a hinged slider may be obtained from U.S. Pat. Nos. 5,010,627, 5,063,644, and 5,070,583 to Herrington, which are incorporated herein by reference in their entireties. In an alternative embodiments the slider 42 may have a pair of side walls that are temporarily flexed away from each other as the slider 42 is mounted on the fastener 23 and then returned to their original position after the slider 42 is mounted. In another alternative embodiment, prior to the formation of the side seals, the fastener 23 is cut apart at a location where a side seal is to be generated, the ends formed by the cutter are moved laterally relative to each other to expose the ends, and the slider 42 is threaded onto one of the exposed ends. Further details concerning this technique of inserting a slider through a split fastener may be obtained from U.S. Pat. No. 5,431,760 to Donovan, which is incorporated herein by reference in its entirety. In yet another alternative embodiment, prior to the formation of the side seals, the fastener 23 is notched at a location where a side seal is to be generated and the slider 42 is threaded onto the fastener 23 via the notch. The notch is sized to accommodate the slider 42. Further details concerning this technique of inserting a slider onto a notched fastener may be obtained from U.S. application Ser. No. 09/307,937 to Provan et al. entitled "Zipper and Zipper Arrangements and Methods of Manufacturing the Same", filed May 10, 1999, and incorporated herein by reference in its entirety.

After forming the side seals 16 and installing such optional components as a slider 42 and end terminations 44 and 46, a cutter 68 separates the packages 10 from each other at the side seals 16. Each package 10 is then placed beneath a fill tube 70 having a spout that is inserted into a fill opening between the second fin 34 and the second panel 14 (see FIGS. 1 and 2). The fill tube 70 conveys a predetermined amount of product to the interior of the package 10. The gusset 22 expands in response to filling the package 10 with the product.

Figure 6:
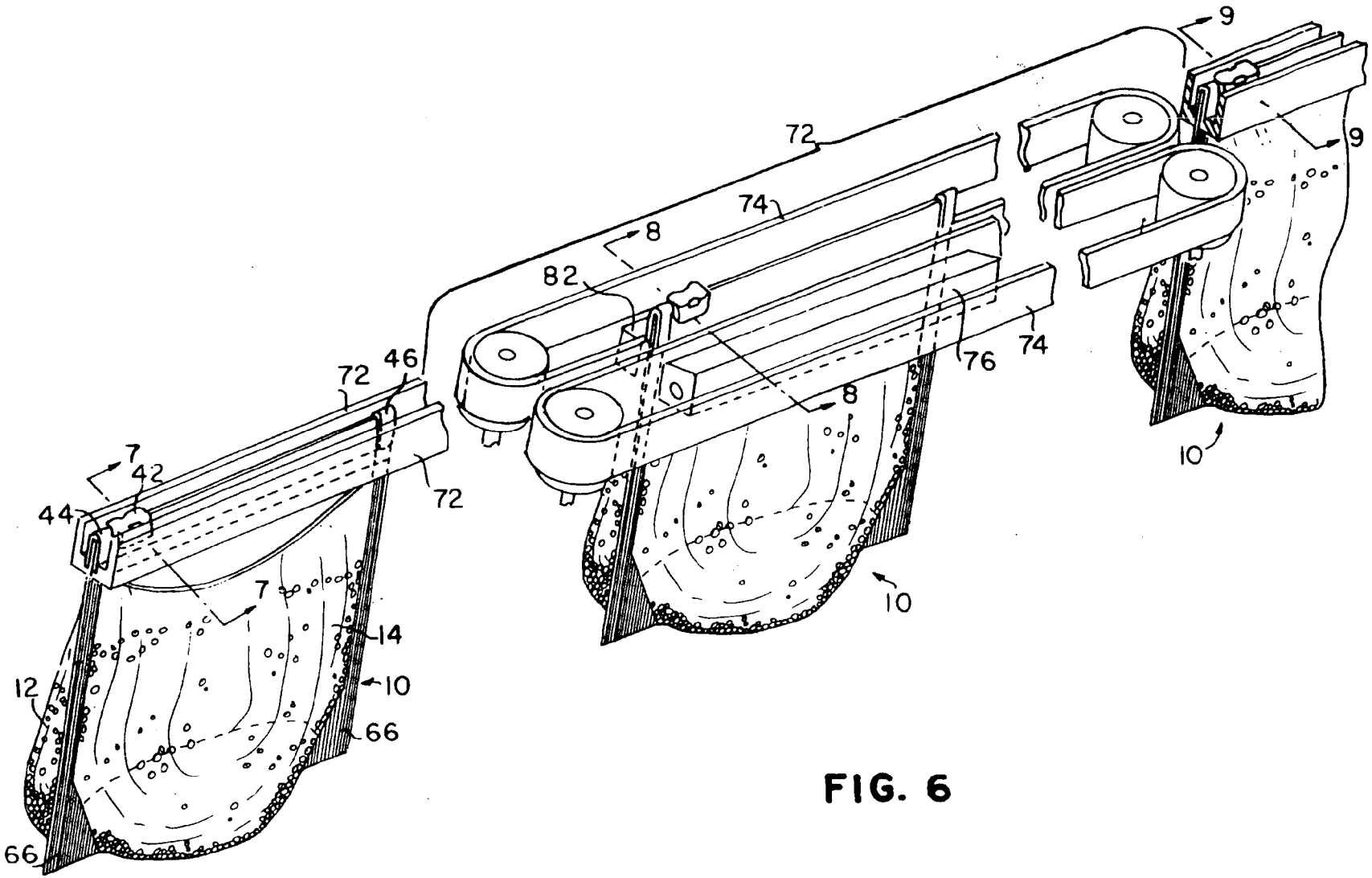
FIG. 6 is a diagrammatic representation of a method and apparatus for sealing the reclosable plastic bag.
Figure 7:
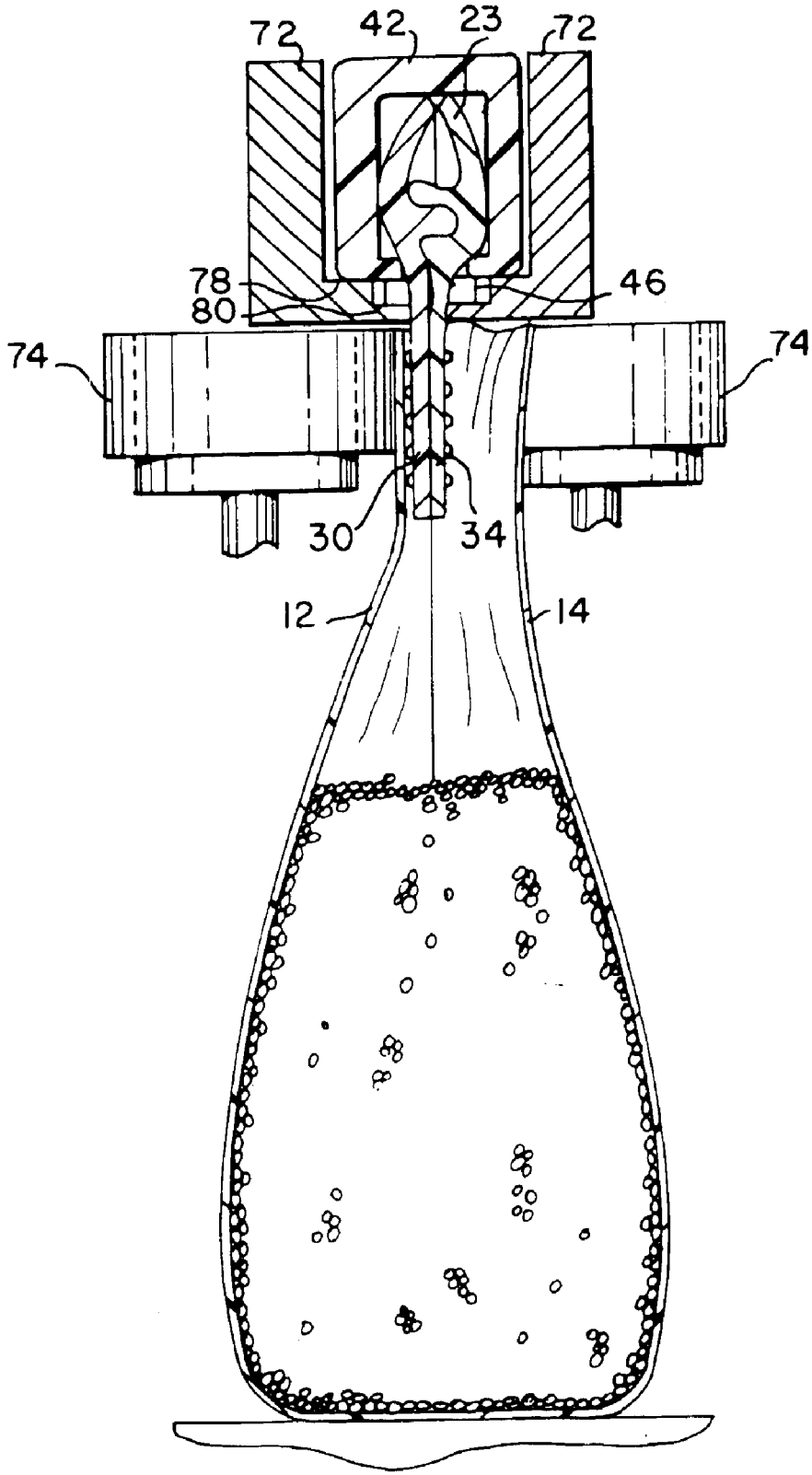
FIG. 7 is a sectional view taken generally along line 7—7 in FIG. 6.

FIG. 6 illustrates a method and apparatus for sealing the filled packages 10 so that they are ready for shipment to and display at a store. The apparatus includes a pair of spaced, profiled guides 72, a pair of moving members 74, a reciprocating heated bar sealer 76, and a stationary backing plate 82. The profiled guides 72 are shaped in cross-section to support each package by either the fastener 23, the slider 42, and/or the end terminations 44 and 46. As best shown in FIG. 7, the illustrated guides 72 include respective first steps 78 for engaging the respective lower shoulders of the slider 42 and respective second steps 80 for engaging the lower sides of the end terminations 44 and 46. The opposing inner vertical faces of the guides 72 below the second steps 80 are spaced sufficiently apart to allow the fins 30 and 34 to fit therebetween, but sufficiently close to minimize the amount of air in the package head space above the product in the filled package. Each filled package 10 may be manually placed between the guides 72 or automatically fed into the guides 72 by conventional conveying equipment. The guides 72 are preferably made of a low-friction, rigid material such as hard anodized aluminum or ultra high density polyethylene.

Figure 8:
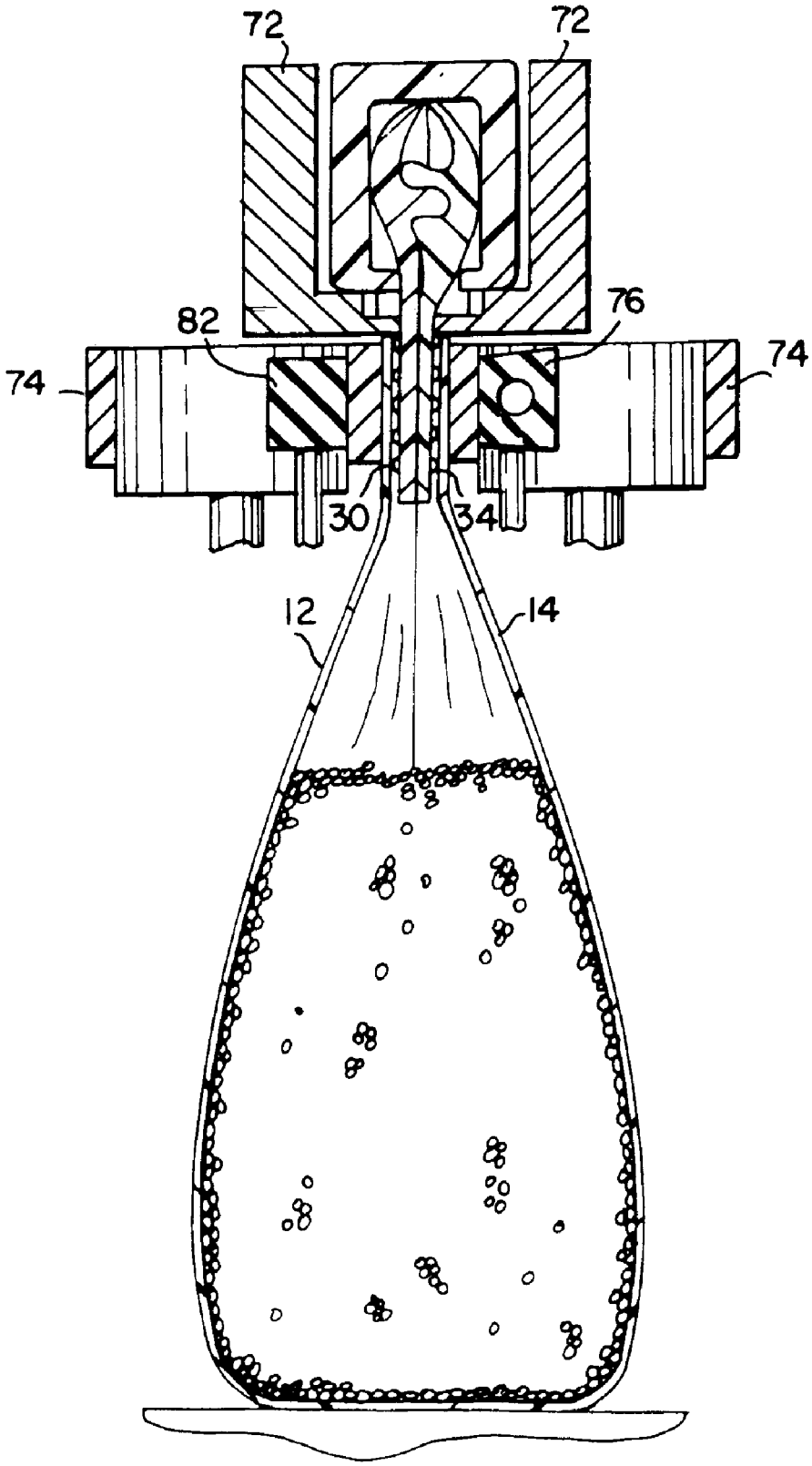
FIG. 8 is a sectional view taken generally along line 8—8 in FIG. 6.
Figure 9:
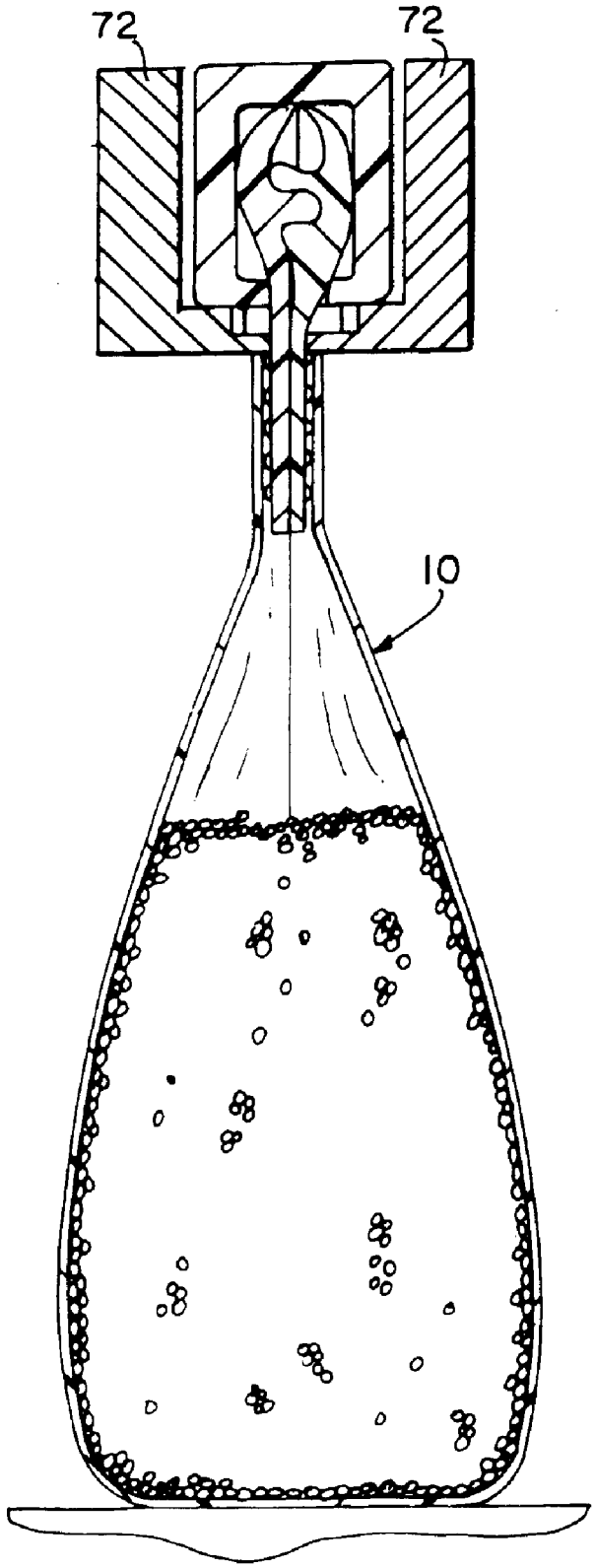
FIG. 9 is a sectional view taken generally along line 9—9 in FIG. 6.

The moving members 74 are disposed on opposite sides of the package 10 beneath the respective guides 72. The moving members 74 continuously or intermittently convey the packages 10 supported by the guides 72 to the sealer 76. Each moving member 74 is preferably a Teflon-coated glass-cloth belt encompassing a pair of spaced pulleys. As shown in FIGS. 6 and 8, the reciprocating heated bar sealer 76 is disposed within one of the conveyor belts, while the backing plate 82 is disposed within the other of the conveyor belts. When a package 10 is disposed between the sealer 76 and the backing plate 82, the sealer 76 presses the package 10 against the backing plate 82 (with the belts disposed therebetween) to attach the second fin 34 to the second panel 14 in the region between the sides 16, thereby sealing the fill opening of the filled package 10 (see FIG. 8). The backing plate 82 is optionally cooled with chilled water or cool air as such pressure is applied by the sealer 76. Additional cooling bars are optionally located within the moving members 74 downstream from the sealer 76 and the backing plate 82. Instead of the heated bar sealer 76, the apparatus for sealing the filled packages may include a heated band of metal, such as steel, lining the inner surface of the belt of each moving member 74 and moving with the belt. The heated bands inside the respective belts seal the second fin 34 to the second panel 14 as the belts convey the assocaited package 10 through the guides 72. Once the fill opening is sealed, the package 10 is ready for shipment to and display at a store. The fully sealed package 10 is shown in FIG. 9.

The package 10 may be composed of various plastic polymers, copolymers, coextrusions and/or laminations. The panels 12 and 14 are preferably comprised of mono-layer or multi-layer combinations of: polyethylene (high, medium, low, linear low, and/or ultra low density polymers including metallocene); polypropylene (oriented and/or biaxially oriented); ethylene vinyl acetate; nylon (oriented and/or biaxially oriented); polyethylene terephthalate (oriented and/or biaxially oriented); polyvinyl chloride; ethylene vinyl alcohol (EVOH); polyvinylidene chloride (PVDC); polyvinyl alcohol (PVOH); polystyrene; foil and/or metalization; and paper. The slider 42 and end terminations 44 and 46 are preferably comprised of mono-material, blends, alloys, and/or co-polymers of: polyethylene (high, medium, low, linear low, and/or ultra low density polymers); polypropylene (oriented and/or biaxially oriented); ethylene vinyl acetate; nylon (oriented and/or biaxially oriented); thermoplastic polyesters; polycarbonate; acrylics; and/or polystyrene. The profiles 12 and 14 and the fins 30 and 34 are preferably comprised of mono-layer, blends, alloys, coextrusions, laminations and/or coatings of: polyethylene (high, medium, low, linear low, and/or ultra low density polymers including metallocene); polypropylene (oriented and/or biaxially oriented); ethylene vinyl acetate; nylon (oriented and/or biaxially oriented); polyethylene terephthalate (oriented and/or biaxially oriented); polyvinyl chloride; ethylene vinyl alcohol (EVOH); polyvinylidene chloride (PVDC); polyvinyl alcohol (PVOH); polystyrene; foil and/or metalization; and paper. The sealant ribs 36 and 38 are preferably comprised of mono-material, blends, and/or coextrusions of: polyethylene (low, linear low, and/or ultra low density polymers including metallocene); ethylene vinyl acetate, adhesive or low melting temperature sealant.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of filling a package, made from a continuous web of material comprising:

providing a plurality of interconnected packages made from said web, each package including first and second opposing body panels joined along a pair of sides and a bottom bridging the sides, the package including a fastener attached to the first body panel along a mouth portion of the package disposed opposite the bottom, the fastener initially being at least partially unattached to the second body panel while the fastener is attached to the first body panel;

separating each package from said plurality of interconnected packages;

filling the separated package with a product via a fill opening between the fastener and the second body panel; and attaching the fastener to the second body panel of the filled package to seal the fill opening.

2. The method of claim 1, wherein the fastener includes first and second interlocking profiles and first and second fins extending from the respective profiles, the first and second fins being joined along the breakable area of weakness, the first fin being attached to the first body panel, the second fin being at least partially unattached to the second body panel while the fastener is attached to the first body panel.

3. The method of claim 2, wherein the fill opening in the step of filling the package is between the second fin and the second body panel.

4. The method of claim 3, wherein the step of attaching the fastener to the second body panel includes attaching the second fin to the second body panel.

5. The method of claim 1 further including the step of sealing said first and second body panels above said fastener.

6. A method of making and filling a packages, comprising:

providing a package including first and second opposing body panels;

attaching a fastener to the first body panel along a mouth portion of the package;

attaching said first and second panels to each other to form a pair of sides and a bottom bridging the sides opposite the fastener;

filling the package with a product via a fill opening between the fastener and the second body panel; and attaching the fastener to the second body panel to seal the fill opening.

7. The method of claim 6, wherein the fastener includes first and second interlocking profiles and first and second fins extending from the respective profiles, the fill opening in the step of filling the package being between the second fin and the second body panel, wherein the step of attaching the fastener to the first body panel includes attaching the first fin to the first body panel, and wherein the step of attaching the fastener to the second body panel includes attaching the second fin to the second body panel.

8. The method of claim 7, wherein the first and second fins are joined to each other along the breakable area of weakness.

9. A method of making and filling packages, comprising:

providing a plastic web and a fastener in a longitudinal direction;

folding the web to provide first and second opposing panels joined along a longitudinal bottom;

attaching the fastener to an inner surface of the first panel near a longitudinal edge thereof opposite the longitudinal bottom;

sealing the first and second panels to each other at spaced seals transverse to the longitudinal direction to form the packages;

filling each package with a product via a fill opening between the fastener and the second panel; and attaching the fastener to an inner surface of the second panel to seal the fill opening.

10. The method of claim 9, wherein said bottom includes a gusset.

11. A method of filling a package made from a continuous web of material, comprising:

providing a plurality of interconnected packages made from said web, each package including two panels defining a mouth portion and a reclosable fastener that is useful for opening and closing said mouth portion after said package is filled, said fastener having a final attachment position on said two panels and being attached to said two panels along only a portion of said final attachment position so as to define an unattached segment and an attached segment of said fastener, said unattached segment and the adjacent one of said two panels define a fill opening therebetween;

filling said package with a product through said fill opening; and separating each package from said plurality of interconnected packages;

attaching said unattached segment of said fastener to said panels along the entirety of said final attachment position.

12. The method of claim 11, wherein said package includes a bottom with a gusset.

13. The method of claim 11, wherein said fastener includes a first interlocking profile with a first fin and second interlocking profile with a second fin.

14. The method of claim 13, wherein said first and second fins are joined along a breakable area of weakness.

15. The method of claim 13, wherein, during said providing step, said first fin is attached to a first one of said two panels along said final attachment position and said second fin is at least partially unattached to a second one of said two panels along said final attachment position, said second fin and said second panel defining said fill opening.

16. The method of claim 14, wherein said second fin is entirely unattached to said second one of said two body panels along said final attachment position.

*17. A method of making and filling packages, comprising:*

*providing first and second opposing panels of a plastic web and a fastener in a longitudinal direction;*

*attaching said fastener to an inner surface of said first panel;*

*sealing said first and second panels to each other at spaced seals transverse to said longitudinal direction to form said packages;*

*filling each package with a product via a fill opening between said fastener and said second panel; and*

*attaching said fastener to an inner surface of said second panel to seal said fill opening.*

*18. A method of filling a package, made from a continuous web of material comprising:*

*providing a plurality of interconnected packages made from said web, each package including first and second opposing body panels joined along a pair of sides and a bottom bridging said sides, said package including a fastener attached to said first body panel along a mouth portion of said package disposed opposite said bottom, said fastener including first and second interlocking profiles, and first and second fins extending from said respective profiles, said first fin being attached to said first body panel, said second fin being at least partially unattached to said second body panel while said first fin is attached to said first body panel, said package further including a tamper-evident feature positioned below said first and second interlocking profiles;*

*separating each package from said plurality of interconnected packages;*

*filling said separated package with a product via a fill opening between said fastener and said second body panel; and*

*attaching said fastener to said second body panel of said filled package to seal said fill opening.*

*19. The method of claim 18, wherein said fill opening for filling said package is between said second fin and said second body panel.*

*20. The method of claim 19, wherein said attaching said fastener to said second body panel includes attaching said second fin to said second body panel.*

*21. The method of claim 18, further including sealing said first and second body panels above said fastener.*

*22. The method of claim 18, wherein said tamper-evident feature is a breakable area of weakness on at least one of said first and second fins.*

*23. A method of making and filing a package, comprising:*

*providing a package including first and second opposing body panels;*

*attaching a fastener to said first body panel along a mouth portion of said package, said fastener including first and second interlocking profiles, first and second fins extending from said respective profiles, and a breakable area of weakness providing a tamper-evident feature, said first fin being attached to said first body panel, said second fin being at least partially unattached to said second body panel while said first fin is attached to said first body panel;*

*attaching said first and second panels to each other to form a pair of sides and a bottom bridging said sides opposite said fastener;*

*filling said package with a product via a fill opening between said fastener and said second body panel; and*

*attaching said fastener to said second body panel to seal said fill opening.*

*24. The method of claim 23, wherein said fill opening in filling said package is between said second fin and said second body panel, and wherein attaching said fastener to said second body panel includes attaching said second fin to said second body panel.*

*25. A method of making and filling packages, comprising:*

*providing a plastic web and a fastener in a longitudinal direction, said fastener including first and second interlocking profiles, first and second fins extending from said respective profiles, and a breakable area of weakness;*

*folding said web to provide first and second opposing panels joined along a longitudinal bottom;*

*attaching said fastener to an inner surface of said first panel near a longitudinal edge thereof opposite said longitudinal bottom;*

*sealing said first and second panels to each other at spaced seals transverse to said longitudinal direction to form said packages;*

*filling each package with a product via a fill opening between said fastener and said second panel; and*

*attaching said fastener to an inner surface of said second panel to seal said fill opening.*

*26. The method of claim 25, wherein said bottom includes a gusset.*

*27. A method of filling a package made from a continuous web of material, comprising:*

*providing a plurality of interconnected packages made from said web, each package including first and second body panels defining a mouth portion and a reclosable fastener that is useful for opening and closing said mouth portion after said package is filled, said fastener having a final attachment position on said first and second body panels and being attached to said first and second body panels along only a portion of said final attachment position so as to define an unattached segment and an attached segment of said fastener, said unattached segment and said adjacent second body panel defining a fill opening therebetween, said fastener including first and second interlocking profiles and first and second fins extending from said respective profiles, said first fin being attached to said first body panel, said second fin being at least partially unattached to said second body panel while said first fin is attached to said first body panel, each of said packages including a tamper-evident feature below said first and second interlocking profiles;*

*filling said package with a product through said fill opening;*

*separating each package from said plurality of interconnected packages; and*

*attaching said unattached segment of said fastener to said panels along the entirety of said final attachment position.*

*28. The method of claim 27, wherein said tamper-evident feature is a breakable area of weakness on at least one of said first and second fins.*

*29. The method of claim 27, wherein said first fin is attached to said first body panel along an entire length of said package during said filling step.*

*30. A method of making a reclosable package, comprising:*

*supplying a web of plastic material in a longitudinal direction, said web having first and second opposing body panels;*

*supplying a reclosable fastener including a first profile and a second profile adapted to releasably interlock with said first profile, said fastener including a slider for opening and closing said first and second profiles;*

*with said slider attached to said reclosable fastener, attaching said first profile to said first panel;*

*creating individual packages from said web and said reclosable fastener;*

*filling said individual package with a product via a fill opening between said second profile and said second panel; and*

*attaching said second profile to said second panel to seal said fill opening.*

*31. The method of claim 30, wherein said bottom includes a gusset that expands in response to filling said package with said product.*

*32. The method of claim 30, wherein said supplying said web includes folding said web to develop said first and second opposing body panels.*

*33. The method of claim 30, further including separating said individual packages from a remainder of said web.*

*34. The method of claim 30, wherein said fastener includes a plurality of first sealant ribs on an outer surface of said second profile to facilitate attaching said second profile to said second panel.*

*35. The method of claim 30, further including a tamper-evident feature below said first and second profiles.*

*36. The method of claim 35, wherein said tamper-evident feature is a breakable area of weakness on at least one of a pair of fins attached to said first and second profiles.*

*37. The method of claim 30, further including creating end terminations on said individual packages for stopping movement of said slider.*

*38. The method of claim 30, further including sealing said first and second body panels above said fastener.*

*39. The method of claim 30, wherein said attaching said first profile to said first panel occurs along an entire length of said individual package.*

*40. The method of claim 30, wherein said attaching said first profile to said first panel occurs via attaching to said first panel a structure that is connected to said first profile.*

*41. The method of claim 40, wherein said connected structure is a fin connected to said first profile.*

*42. A method of filling a package made from a continuous web of material comprising:*

*providing a plurality of interconnected packages made from said web, each package including first and second opposing body panels joined along a pair of sides and a bottom bridging said sides, said package including a fastener attached to said first body panel along a mouth portion of said package disposed opposite said bottom and a slider for opening and closing said fastener, said fastener including first and second interlocking profiles and first and second fins extending from said respective profiles, said fastener initially being at least partially unattached to said second body panel while said fastener is attached to said first body panel;*

*separating each package from said plurality of interconnected packages;*

*filling said separated package with a product via a fill opening between said fastener and said second body panel;*

*attaching said fastener to said second body panel of said filled package to seal said fill opening; and*

*sealing said first and second body panels above said fastener.*

*43. The method of claim 42, wherein said fill opening is between said second fin and said second body panel.*

*44. The method of claim 42, wherein said fastener is entirely unattached to said second opposing body panel before filling said separated package.*

*45. The method of claim 42, further including folding said web to provide said bottom and said first and second opposing body panels.*

*46. The method of claim 45, wherein said attaching said fastener to said first body panel occurs after folding said web.*

*47. The method of claim 42, wherein said slider is attached to said fastener prior to said fastener being attached to said first body panel of said web.*

*48. A method of filling a package made from a continuous web of material comprising:*

*providing a plurality of interconnected packages made from said web, each package including first and second opposing body panels joined along a pair of sides and a bottom bridging said side, said package including a fastener attached to said first body panel along a mouth portion of said package disposed opposite said bottom and a slider for opening and closing said fastener, said fastener including first and second interlocking profiles and first and second fins extending from said respective profiles, said fastener initially being at least partially unattached to said second body panel while said fastener is attached to said first body panel;*

*creating a pair of end terminations for stopping movement of said slider near said respective sides of said package;*

*separating each package from said plurality of interconnected packages;*

*filling said separated package with a product via a fill opening between said fastener and said second body panel;*

*attaching said fastener to said second body panel of said filled package to seal said fill opening; and*

*sealing said first and second body panels above said fastener.*

*49. The method of claim 48, wherein said fill opening is between said second fin and said second body panel, wherein said attaching said fastener to said first body panel includes attaching said first fin to said first body panel, and wherein attaching said fastener to said second body panel includes attaching said second fin to said second body panel.*

*50. The method of claim 48, wherein said fastener is entirely unattached to said second body panel before filling said separated package.*

*51. The method of claim 48, wherein said bottom is formed by folding said web.*

*52. The method of claim 51, wherein attaching said fastener to said first body panel occurs after folding said web.*

*53. The method of claim 48, wherein said slider is attached to said fastener prior to said fastener being attached to said first body panel of said web.*

*54. The method of claim 48, wherein said first fin is attached to said first body panel along an entire length of said package during said filling step.*

*55. A method of filling a package made from a continuous web of material, comprising:*

*attaching a reclosable fastener with an attached slider to a web, said reclosable fastener including a first profiled and a second profile adapted to releasably interlock with said first profile, said first profile being attached to said web, said slider for opening and closing said first and second profiles;*

*creating individual reclosable packages from said web and said reclosable fastener;*

*filling each of said individual packages with a product via a fill opening between said second profile and said web; and*

*attaching said second profile to said second panel to seal said fill opening in said individual packages.*

*56. The method of claim 55, wherein said web includes first and second body panels, and said method including sealing said first and second body panels above said fastener.*

*57. The method of claim 56, wherein said package further includes a tamper-evident feature below said first and second profiles.*

*58. The method of claim 57, wherein said tamper-evident feature is a breakable area of weakness on at least one of a pair of fins attached to said first and second profiles.*

*59. The method of claim 55, wherein said package further includes a tamper-evident feature below said first and second profiles.*

*60. The method of claim 55, further including creating a pair of end terminations for stopping movement of said slider near respective sides of said package.*

*61. The method of claim 60, wherein said web includes first and second body panels, and further including sealing said first and second body panels above said fastener.*

*62. The method of claim 55, wherein said plurality of interconnected packages includes a bottom disposed opposite of said fill opening, further including folding said web to form said bottom and said first and second panels.*

*63. The method of claim 55, wherein said first fin is attached to said first body panel along an entire length of said package during said filling step.*

*64. A method of filling a package made from a continuous web of material, comprising:*

*providing a plurality of interconnected packages made from said web, each package including first and second body panels defining a mouth portion and a reclosable-fastener that is useful for opening and closing said mouth portion after said package is filled, said fastener having a final attachment position on said first and second body panels and being attached to said first and second body panels along only a portion of said final attachment position so as to define an unattached segment and an attached segment of said fastener, said unattached segment partially defining a fill opening;*

*filling said package with a product through said fill opening;*

*separating each package from said plurality of interconnected packages; and*

*attaching said unattached segment of said fastener to said panels along the entirety of said final attachment position.*

*65. The method of claim 64, wherein said package includes a tamper-evident feature below said fastener.*

*66. The method of claim 65, wherein said tamper-evident feature is a breakable area of weakness on at least one of a pair of fins attached to said first and second profiles.*

*67. The method of claim 65, wherein said fastener includes a slider, said slider being attached to said fastener prior to said fastener being attached along said final attachment position.*

*68. The method of claim 64, further including sealing said first and second body panels above said fastener.*

*69. The method of claim 64, wherein said fastener includes a slider, said slider being attached to said fastener prior to said fastener being attached along said final attachment position.*

* * * * *